US007419036B2

(12) United States Patent
Birkeneder

(10) Patent No.: US 7,419,036 B2
(45) Date of Patent: Sep. 2, 2008

(54) DISC BRAKE FOR VEHICLES HAVING AN APPLICATION DEVICE WITH A NEEDLE BEARING

(75) Inventor: Franz-Josef Birkeneder, Aldersbach (DE)

(73) Assignee: Knorr-Bremse Systeme fuer Nutzfahrzeuge GmbH, Munich (DE)

( * ) Notice: Subject to any disclaimer, the term of this patent is extended or adjusted under 35 U.S.C. 154(b) by 0 days.

(21) Appl. No.: 11/648,532

(22) Filed: Jan. 3, 2007

(65) Prior Publication Data

US 2007/0187190 A1    Aug. 16, 2007

Related U.S. Application Data

(63) Continuation of application No. PCT/EP2005/007025, filed on Jun. 30, 2005.

(30) Foreign Application Priority Data

Jul. 1, 2004    (DE) ................. 10 2004 031 792

(51) Int. Cl.
*F16D 55/08*    (2006.01)
(52) U.S. Cl. ............... 188/72.9; 384/569; 384/621
(58) Field of Classification Search ............. 188/72.6, 188/72.7, 72.9; 384/310, 572, 576, 580, 384/581, 582, 621, 622, 623, 569
See application file for complete search history.

(56) References Cited

U.S. PATENT DOCUMENTS

| 3,046,064 | A | * | 7/1962 | Schaeffler ............... 384/572 |
| 3,507,546 | A | | 4/1970 | Haslimann et al. |
| 4,993,849 | A | * | 2/1991 | Radinger et al. .......... 384/447 |
| 5,343,984 | A | | 9/1994 | Bieker et al. |
| 5,433,298 | A | | 7/1995 | Antony et al. |
| 5,882,124 | A | | 3/1999 | Diemer et al. |
| 6,250,434 | B1 | | 6/2001 | Baumgartner et al. |
| 6,857,785 | B2 | * | 2/2005 | Takahashi et al. .......... 384/572 |
| 6,969,202 | B2 | * | 11/2005 | Kackowski ................ 384/580 |

FOREIGN PATENT DOCUMENTS

DE    1 955 239 U    2/1967

(Continued)

OTHER PUBLICATIONS

Product Information: Air Disc Brake, Generation SN5, SN6 and SN7—*Knorr-Bremse Systems for Commercial Vehicles*, pp. 1-2.

(Continued)

*Primary Examiner*—Thomas J Williams
(74) *Attorney, Agent, or Firm*—Crowell & Moring LLP

(57) ABSTRACT

A disc brake for vehicles, in particular to a pneumatically actuated disc brake for utility vehicles, is provided. The disc brake includes a brake caliper and an application device for applying the brake. The application device has a first component in the form of a rotary lever, which is displaceably guided on a second element, such as a surface of the brake caliper, by way of a needle bearing. The disc brake is characterized in that the inner ring of the needle bearing is embodied as a bearing cage made of plastic, the cage enclosing on its outside an evenly configured ring of sheet metal serving as the bearing exterior.

4 Claims, 5 Drawing Sheets

FOREIGN PATENT DOCUMENTS

| | | |
|---|---|---|
| DE | 34 11 745 A1 | 10/1985 |
| DE | 42 04 307 A1 | 8/1993 |
| DE | 195 42 876 A1 | 5/1997 |
| DE | 197 31 696 A1 | 2/1999 |
| DE | 102 36 606 A1 | 2/2004 |
| DE | 10236606 A1 * | 2/2004 |
| GB | 1198309 | 7/1970 |
| JP | 07-269573 | 10/1995 |
| JP | 2005172059 A * | 6/2005 |

OTHER PUBLICATIONS

Product Information: Air Disc Brake, Generation SK7—*Knorr-Bremse Systems for Commercial Vehicles,* pp. 1-2.

Sevice Manual, C16352-EN-005, Pneumatic Disc Brake, SBb . . . /SB7 . . . Axial and Radial Disc Brake, *Knorr-Bremse Systems for Commercial Vehicles,* pp. 1-52.

International Search Report dated Nov. 7, 2005.

* cited by examiner d)

e)

DISC BRAKE FOR VEHICLES HAVING AN APPLICATION DEVICE WITH A NEEDLE BEARING

CROSS-REFERENCE TO RELATED APPLICATIONS

This application is a continuation of PCT International Application No. PCT/EP2005/007025, filed on Jun. 30, 2005, which claims priority under 35 U.S.C. §119 to German Application No. 10 2004 031 792.5, filed Jul. 1, 2004, the entire disclosures of which are expressly incorporated by reference herein.

BACKGROUND AND SUMMARY OF THE INVENTION

The invention relates to a disc brake for vehicles, in particular a pneumatically actuated disc brake for commercial vehicles.

In general, disc brakes are known and can take various forms. For example, Knorr Bremse Systeme fuer Nutzfahrzeuge GmbH produces commercial disc brakes having the product designations SB6 and SB7, and also SN6 and SN7. The present invention is, in particular, suitable for use in brakes of this type, but is also suitable in principle for other types of disc brakes in which a first moveable brake component, in particular a rotary lever which is to be mounted eccentrically, is mounted on a further brake component by use of a circular-arc-shaped needle bearing. Here, the terms "outer ring" and "inner ring" do not denote closed rings but rather components which extend in an arcuate fashion over at least part of a circle.

Needle bearings or rolling bearings having an outer ring, an inner ring, and a set of bearing needles, have been proven per se for mounting brake parts which are moveable relative to one another. A need for optimization is seen, in particular, in the relatively high cost expenditure in producing needle bearings of that type.

The present invention seeks to solve this problem by providing a disc brake for vehicles, in particular a pneumatically actuated disc brake for commercial vehicles, having a brake caliper and an application device, which is arranged in the brake caliper, for applying the brake. The application device has a first component, preferably a rotary lever, which is mounted in a moveable fashion on a second component, such as the interior of the brake caliper, by way of a needle bearing having a set of bearing needles, an outer ring and an inner ring, which is embodied as a bearing cage. The outer ring and the inner ring have the geometry of a section of a circular arc. The inner ring, which is embodied as a bearing cage, is made from plastic and engages in a U-shaped fashion around a sheet metal ring forming the outer ring.

According to the invention, the inner ring is thus embodied as a plastic bearing cage, which engages in a U-shaped fashion around a "planar" sheet metal ring as the outer bearing ring. Since the outer ring is composed of a metal sheet, which—with the exception of the functional elements such as lugs or the like—can be produced in a simple manner in one single bending process, and since the function of the lateral cage walls is assumed by the plastic inner ring which can be produced in a cost-effective manner for example as an injection-molded part, the costs of producing the needle bearing and, therefore, the costs of producing the disc brake can be lowered while nevertheless providing functionality which is the same as or improved over that of the prior art. According to the prior art, in contrast, the outer ring was manufactured as a sheet metal arc with two lateral cage walls. However, the two lateral case walls could only be attached to the very hard metal sheet which was to be used by complex and expensive production processes. Counter to previous expectations, however, it is possible for the function of laterally delimiting the cage to be moved to the plastic inner ring.

Advantageous embodiments are described and claimed herein.

Other objects, advantages and novel features of the present invention will become apparent from the following detailed description of the invention when considered in conjunction with the accompanying drawings.

BRIEF DESCRIPTION OF THE DRAWINGS

The invention is explained in more detail below on the basis of an exemplary embodiment and with reference to the drawings, in which.

DETAILED DESCRIPTION OF THE DRAWINGS

Figure 3:
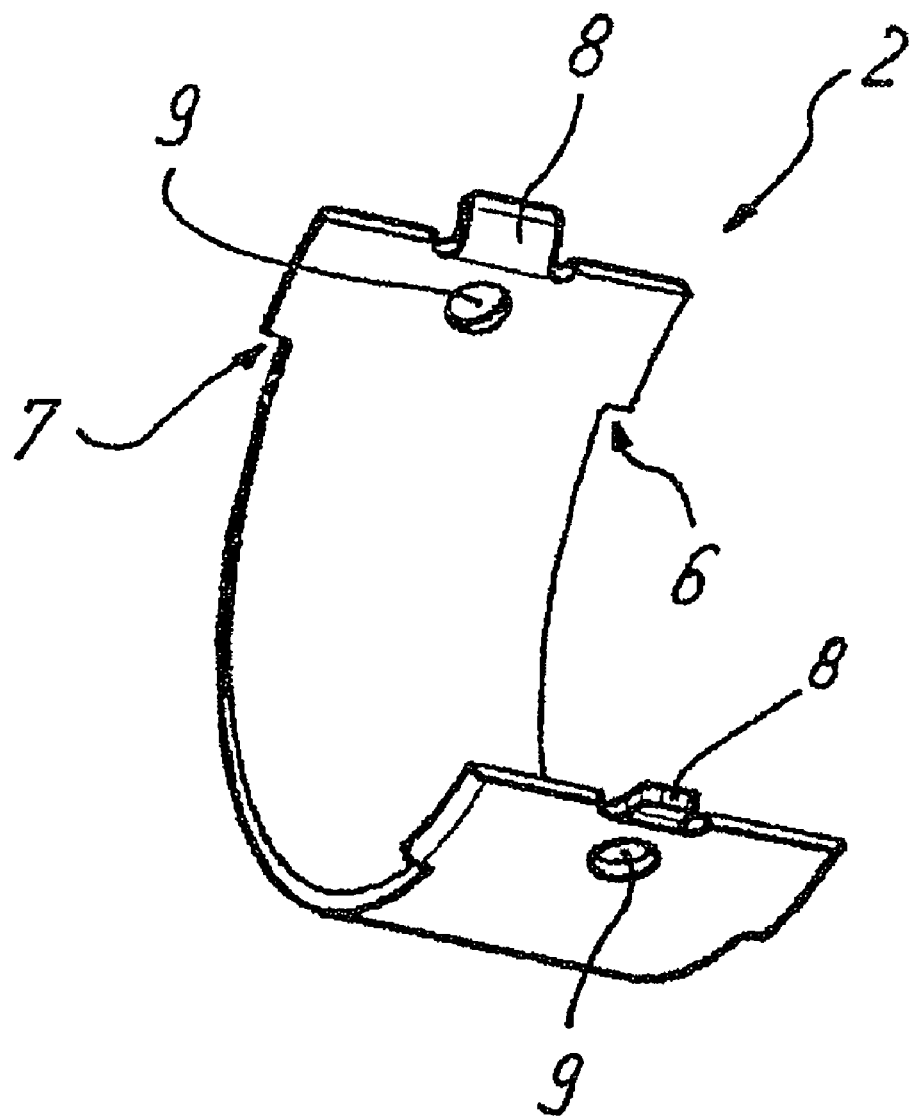
FIG. 3 is a perspective view of the outer ring of the needle bearing from FIG. 1.
Figure 4:
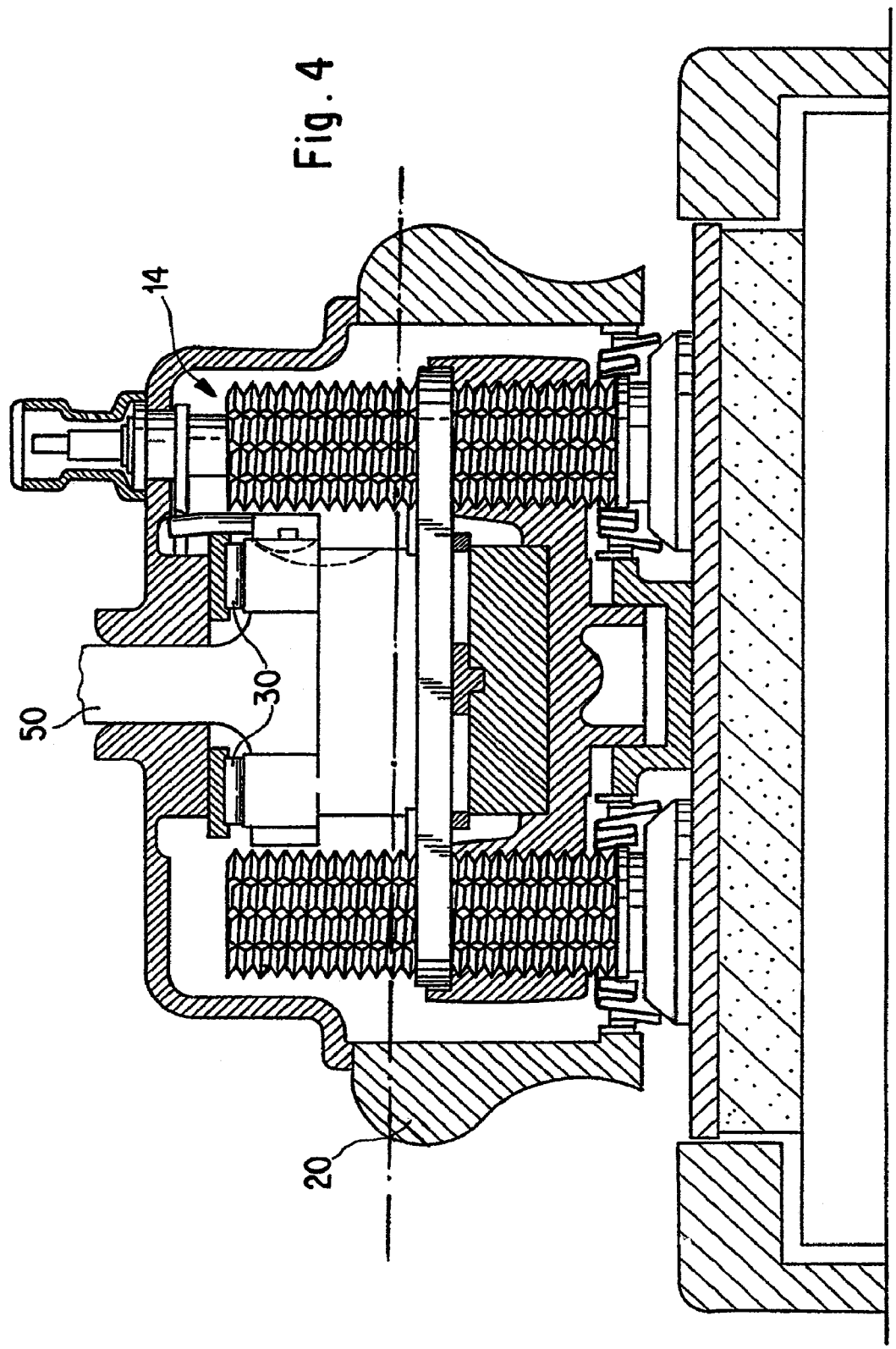
FIG. 4 illustrates, in partial cross-section, a portion of a disc brake that may utilize the needle bearings of FIGS. 1-3.

Referring to FIG. 4, a disc brake for a commercial vehicle is shown. The disc brake includes a caliper 20 (shown in cross-section) in which is arranged an application device 14 for applying the brake. The application device 14 includes a first component, such as lever 50, mounted in a movable fashion on a second component, such as an inner surface of the disc brake, via a bearing 30. The bearing 30 is a needle bearing used, in particular, for mounting the rotary lever 50 for example on the caliper of the disc brake (see FIGS. 1-3 described below).

Figure 1:
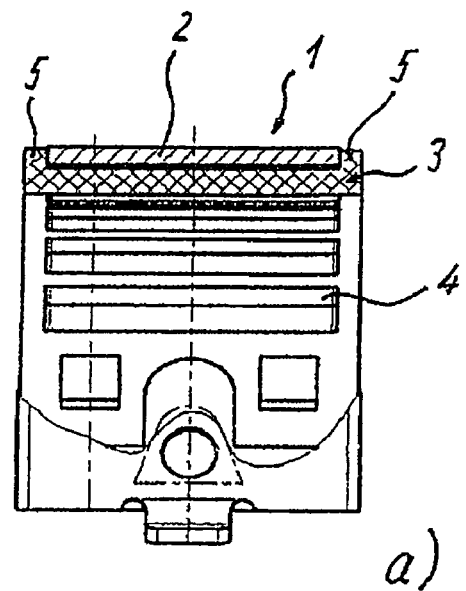
FIGS. 1*a-e* are various views of a needle bearing according to the invention.
Figure 1:
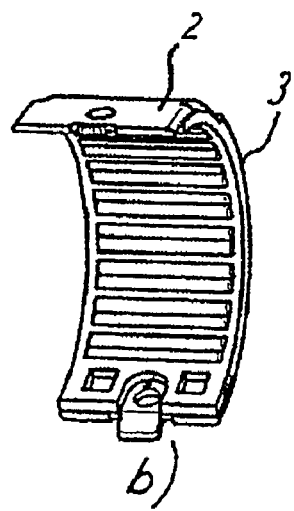
Figure 1:
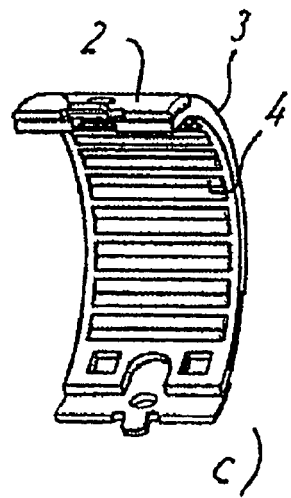
Figure 1:
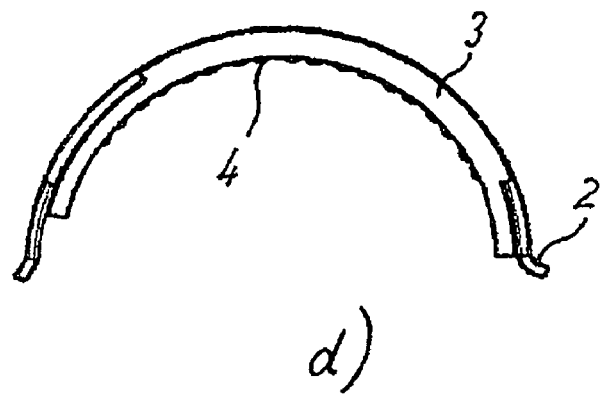
Figure 1:
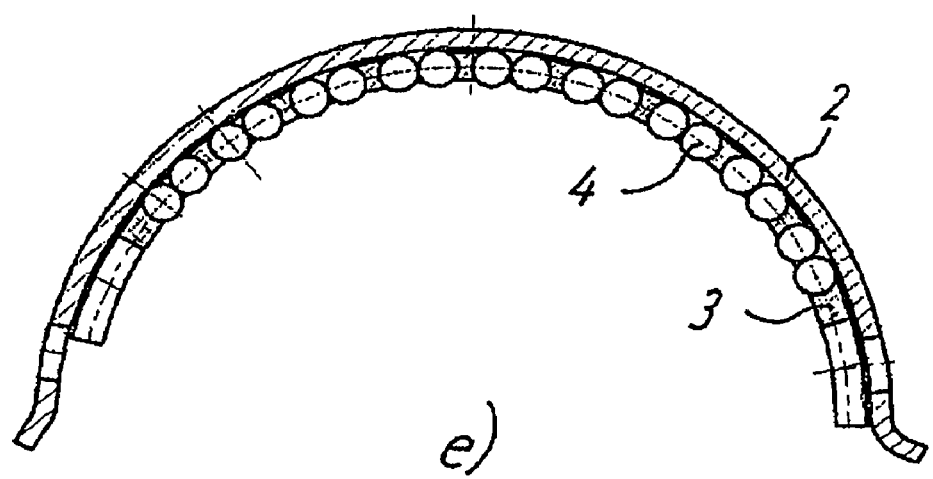

FIG. 1 shows a needle bearing 1 for a disc brake (not otherwise illustrated here), which needle bearing 1 may be used in particular for mounting the rotary lever for example on the brake caliper of a disc brake as is known, for example, under the product designations SN6 or SN 7 or else as is known in a similar design for example from DE 42 04 307 A (having U.S. counterpart 5,343,984, the specification of which is expressly incorporated by reference herein) (see the rolling bearing 3 in that document) or DE 197 31 696 A (having U.S. counterpart 6,250,434, the specification of which is expressly incorporated by reference herein). With regard to the design of disc brakes of that type, which is not discussed in any more detail here, reference is made to the entire contents of such documents.

The needle bearing or rolling bearing 1 illustrated in FIG. 1 has a circular-arc-shaped outer ring 2 and an associated inner ring 3, between which a set of bearing needles 4 is arranged such that the outer ring 2 is mounted so as to be rotationally moveable relative to the inner ring 3.

Figure 2:
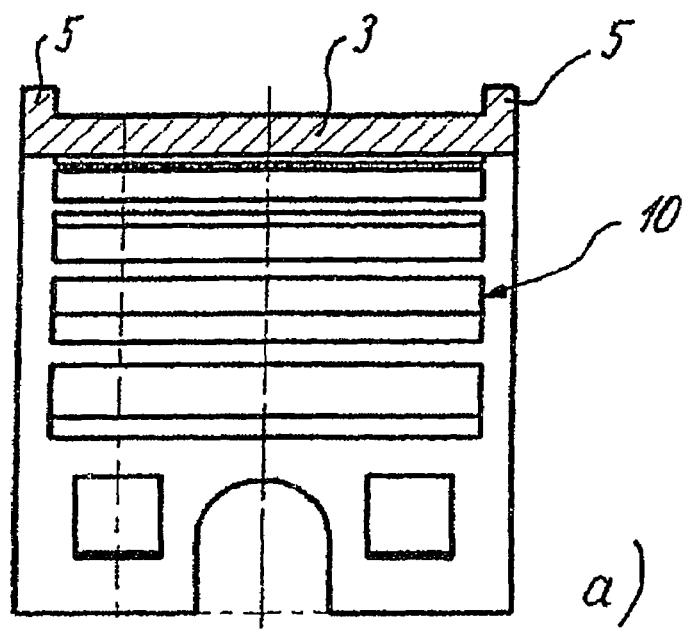
FIGS. 2*a-b* show one perspective view and one partially sectioned view of an inner ring of the needle bearing from FIG. 1.
Figure 2:
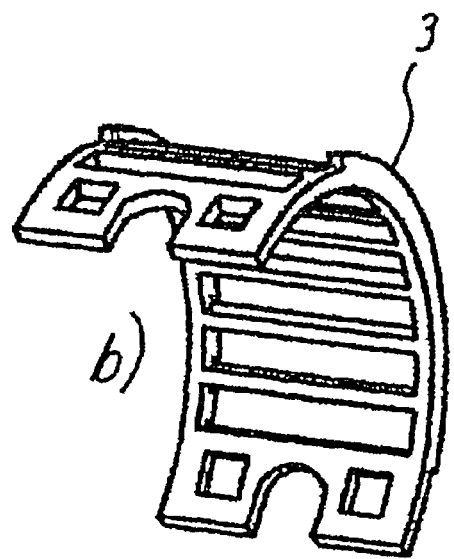

The inner ring 3 is composed of plastic and is provided with two lateral cage walls 5—see also FIG. 2—which are aligned outward perpendicular to the inner ring (radially with respect to the arc-shape) and extend in the direction of the outer ring 2 and laterally border the latter in a u-shaped fashion.

The outer ring 2—see also FIG. 3—is produced from a planar metal sheet which has been bent to form a cylindrical section or into the shape of a circular arc. The outer ring 2 has, at its sides, two lateral cut-outs 6, 7 into which the cage walls 5 of the inner ring engage. The cut-outs 6, 7 extend in such a manner that the inner ring is guided in the cut-outs of the outer ring 2 so as to be moveable to a limited extent. Such that the cut-outs 6, 7 firstly assume the function of movement-limiting stops in a simple manner and secondly serve to correctly guide the outer ring 2 on the inner ring 3 and retain the outer ring 2 in the installed position.

Fastening devices, such as lugs 8 and/or bores 9 fix the inner ring 3 and/or the outer ring 2 to the respectively associated components, which are to be mounted so as to be moveable relative to one another, such as the brake caliper and the rotary lever of the disc brake (not illustrated here).

The plastic inner ring 3 has a plurality of cut-out-like chambers 10 for accommodating, in each case, two of the bearing needles 4. The sheet metal outer ring 2 is, in contrast, composed of a metal sheet which, with the exception of the lugs 9, may be produced in a simple manner in only one single bending process, so that the needle bearing according to the invention can be produced considerably more cost-effectively than the known needle bearing without any impairment in functionality.

TABLE OF REFERENCE SYMBOLS

Needle bearing 1
Outer ring 2
Inner ring 3
Bearing needles 4
Cage walls 5
Cut-outs 6, 7
Lugs 8
Bores 9
Chambers 10

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A disc brake for a vehicle, comprising:
   a brake caliper;
   an application device, which is arranged in the brake caliper, for applying the brake;
   wherein the application device includes a first component mounted in a moveable fashion on a second component via a needle bearing having a set of bearing needles, an outer ring and an inner ring;
   wherein the outer ring and the inner ring have the geometry of a section of a circular arc;
   wherein the inner ring comprises a plastic bearing cage, which engages in a U-shaped fashion around a sheet metal ring, which forms the outer ring;
   wherein the inner ring is provided with two lateral cage walls, which are aligned outward perpendicular to the inner ring and extend in the direction of the outer ring and laterally exteriorly border the outer ring;
   wherein the outer ring is produced from a planar metal sheet, which is bent into the shape of the circular arc;
   wherein the outer ring has lateral cut-outs at two opposite sides, into which lateral cut-outs the cage walls of the inner ring engage; and
   wherein the cut-outs extend such that the inner ring is guided in the cut-outs of the outer ring so as to be moveable to a limited extent, wherein the cut-outs assume the function of movement-limiting stops.

2. The disc brake as claimed in claim 1, wherein the disc brake is a commercial vehicle disc brake.

3. A disc brake for a vehicle, comprising:
   a brake caliper;
   an application device, which is arranged in the brake caliper, for applying the brake;
   wherein the application device includes a first component mounted in a moveable fashion on a second component via a needle bearing having a set of bearing needles, an outer ring and an inner ring;
   wherein the outer ring and the inner ring have the geometry of a section of a circular arc; and
   wherein the inner ring comprises a plastic bearing cage, which engages in a U-shaped fashion around a sheet metal ring, which forms the outer ring;
   wherein the outer ring is produced from a planar metal sheet, which is bent into the shape of the circular arc;
   wherein the outer ring has lateral cut-outs at two opposite sides, into which lateral cut-outs the cage walls of the inner ring engage; and
   wherein the cut-outs extend such that the inner ring is guided in the cut-outs of the outer ring so as to be moveable to a limited extent, wherein the cut-outs assume the function of movement-limiting stops.

4. The disc brake as claimed in claim 3, wherein the disc brake is a commercial vehicle disc brake.

* * * * *